(12) United States Patent
Hosek et al.

(10) Patent No.: US 10,069,371 B2
(45) Date of Patent: Sep. 4, 2018

(54) ROBOT HAVING ISOLATED STATOR AND ENCODER

(71) Applicant: Persimmon Technologies, Corp., Wakefield, MA (US)

(72) Inventors: Martin Hosek, Lowell, MA (US); Christopher Hofmeister, Hampstead, NH (US); Dennis Poole, East Derry, NH (US)

(73) Assignee: Persimmon Technologies Corporation, Wakefield, MA (US)

( * ) Notice: Subject to any disclaimer, the term of this patent is extended or adjusted under 35 U.S.C. 154(b) by 0 days.

(21) Appl. No.: 15/838,819

(22) Filed: Dec. 12, 2017

(65) Prior Publication Data

US 2018/0102684 A1    Apr. 12, 2018

Related U.S. Application Data

(62) Division of application No. 14/691,866, filed on Apr. 21, 2015.

(60) Provisional application No. 61/981,987, filed on Apr. 21, 2014.

(51) Int. Cl.
*H02K 5/128* (2006.01)
*H02K 11/21* (2016.01)
*H02K 16/00* (2006.01)

(52) U.S. Cl.
CPC ............. *H02K 5/128* (2013.01); *H02K 11/21* (2016.01); *H02K 16/00* (2013.01)

(58) Field of Classification Search
CPC ........ H02K 5/128; H02K 11/00; H02K 11/21; H02K 16/00
USPC .................................................. 310/68 B, 89
See application file for complete search history.

(56) References Cited

U.S. PATENT DOCUMENTS

| 5,708,539 A | 1/1998 | Schuh | |
|---|---|---|---|
| 2011/0169358 A1* | 7/2011 | Furukawa | H02K 3/522 310/89 |
| 2012/0069450 A1 | 3/2012 | Bolis | |
| 2013/0177405 A1 | 7/2013 | Legros et al. | |
| 2013/0230369 A1 | 9/2013 | Hofmeister et al. | |
| 2013/0295144 A1 | 11/2013 | Wood et al. | |

\* cited by examiner

*Primary Examiner* — Naishadh Desai
(74) *Attorney, Agent, or Firm* — Harrington & Smith

(57) ABSTRACT

An apparatus including a housing; a motor having a stator and a rotor, where the stator is connected to the housing; an environment barrier extending between the stator and the rotor; and a sealing system connecting the environment barrier with the housing. The sealing system includes a first seal interface and a second seal interface. The first seal interface connects to the housing at a first diameter which is at least partially less than or equal to an inner diameter of the stator. The second seal interface connects to the housing at a second diameter which is at least partially greater than or equal to an outer diameter of the stator.

17 Claims, 18 Drawing Sheets

ROBOT HAVING ISOLATED STATOR AND ENCODER

CROSS REFERENCE TO RELATED APPLICATIONS

This application is a divisional patent application of copending application Ser. No. 14/691,866 filed Apr. 21, 2015, which claims priority under 35 USC 119(e) on U.S. Provisional Application No. 61/981,987 filed Apr. 21, 2014, which are hereby incorporated by reference in their entireties.

BACKGROUND

Technical Field

The exemplary and non-limiting embodiments relate generally to an environment sealing system and, more particularly, to a sealing system for a motor comprising a stator and a rotor.

Brief Description of Prior Developments

Conventional robots have multiple axes of motion that may be any suitable type of joint. These joints typically have motors, position encoders, transmissions and linkages.

SUMMARY

The following summary is merely intended to be exemplary. The summary is not intended to limit the scope of the claims.

In accordance with one aspect, an example embodiment is provided in an apparatus comprising a housing; a motor comprising a stator and a rotor, where the stator is connected to the housing; an environment barrier extending between the stator and the rotor; and a sealing system connecting the environment barrier with the housing, where the sealing system comprises a first seal interface and a second seal interface, where first seal interface connects to the housing at a first diameter which is at least partially less than or equal to an inner diameter of the stator, and where the second seal interface connects to the housing at a second diameter which is at least partially greater than or equal to an outer diameter of the stator.

In accordance with another aspect, an example embodiment is provided in an apparatus comprising a housing; a motor comprising a stator and a rotor, where the stator is connected to the housing; an environment barrier extending between the stator and the rotor; and a sealing system connecting the environment barrier with the housing, where the sealing system comprises a first seal interface and a second seal interface, where the first seal interface connects to the housing at a first diameter which is less than or equal to an inner diameter of the stator, where the second seal interface connects to the housing at a second diameter which is greater than or equal to the inner diameter of the stator, and where the first and second diameters are different.

In accordance with another aspect, an example embodiment is provided in an apparatus comprising a housing; a motor comprising a stator and a rotor, where the stator is connected to the housing; a position encoder comprising an encoder read head and an encoder disk, where the encoder read head is connected to the housing; and an environment barrier connected to the housing, where the environment barrier comprises a one-piece member which extends between the stator and the rotor and which extends between the encoder read head and the encoder disk.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
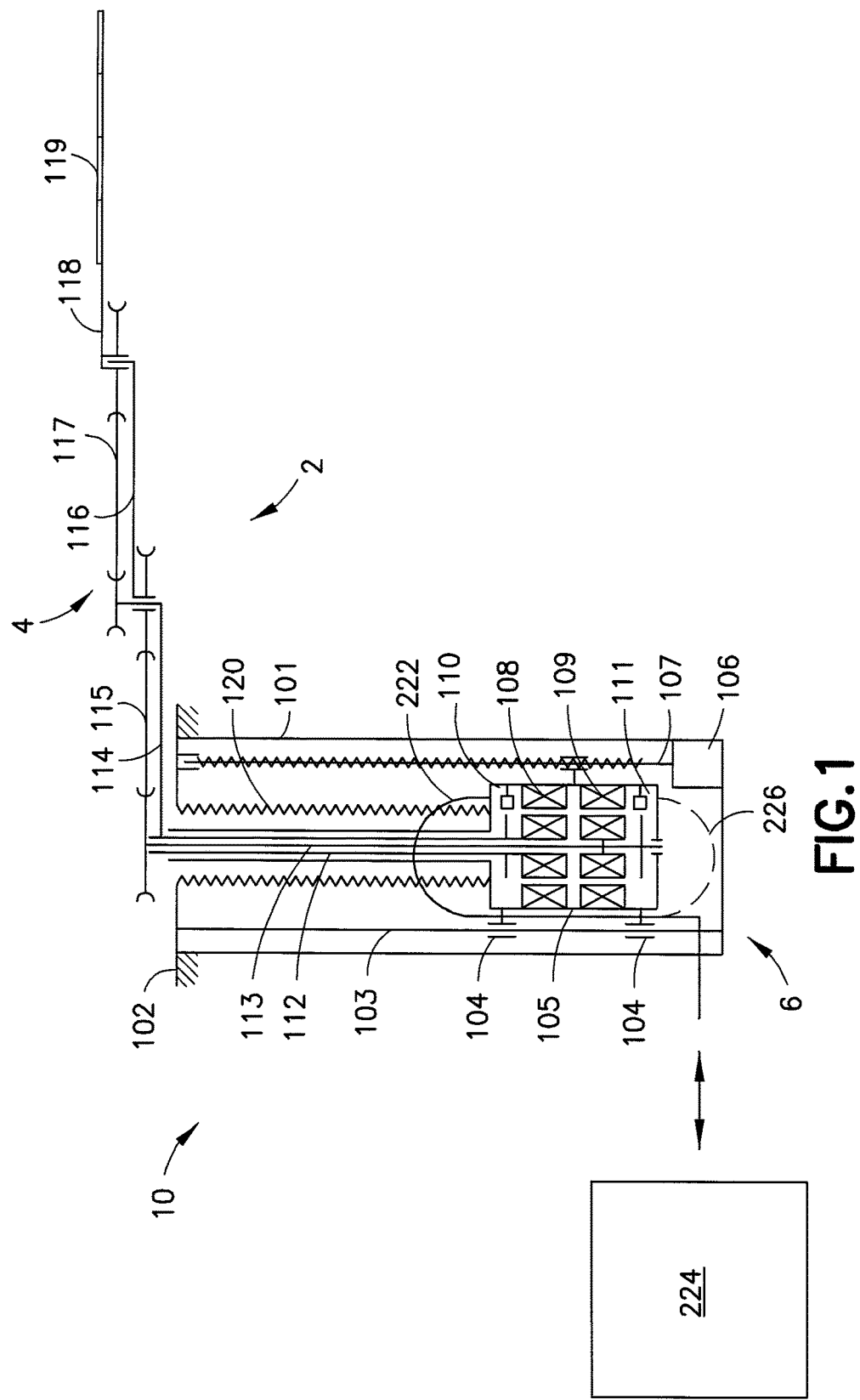
FIG. 1 is a schematic view of an example embodiment comprising features as described herein.

An example of a robot may be a vacuum compatible robot as seen in FIG. 1 where there is shown a schematic view of a robot drive 10 of a substrate transport apparatus 2. Drive 10 may incorporate features as disclosed herein. Although the robot drive 10 is described with respect to a vacuum robot, any suitable robot drive (atmospheric or otherwise) may be provided having features as disclosed. Aside from the preferred embodiment or embodiments disclosed, features as described herein are capable of being provided in other embodiments and of being practiced or being carried out in various ways. Thus, it is to be understood that the invention is not limited in its application to the details of construction and the arrangements of components set forth in the following description or illustrated in the drawings. Moreover, the claims hereof are not to be read restrictively unless there is clear and convincing evidence manifesting a certain exclusion, restriction, or disclaimer.

An example robotic manipulator or apparatus 2 incorporating the vacuum-compatible direct-drive system of one or more embodiments of this invention is shown in FIG. 1. The robotic manipulator may be built around frame 101, such as an aluminum extrusion suspended from flange or mounting arrangement 102 for example. Alternatively, the mounting arrangement may be on the side of frame 101, at the bottom of the frame 101, or the frame 101 may be mounted in any other suitable manner. Frame 101 may incorporate one or more vertical rail 103 with linear bearings 104 to provide guidance to housing 105, driven by motor 106 via ball-screw mechanism 107 for example. Only one rail 103 is shown for simplicity. Alternatively, motor housing 105 may be driven by a linear motor, attached directly to frame 101 or coupled to frame 101 in any other suitable movable or unmovable manner. Motor housing 105 may incorporate one, two, three, four or more direct-drive modules as will be described in greater detail below. Housing 105 may house motors 108, 109 equipped with position encoders 110 and 111. Housing 105 is shown as an exemplary structure where housing 105 may have portions configured with respect to motors 108, 109 and position encoders 110 and 111 as will be described in greater detail below. Bellows 120 may be used to accommodate motion of motors 105 along vertical rail(s) 103, separating the environment where movable components of motors 108, 109 and encoders 110, 111 operate, for instance vacuum, from the outside environment, for example, atmosphere.

In the example of FIG. 1, two direct-drive modules, each having one motor and one encoder, are shown. However, any suitable number of direct-drive modules with any suitable number of motors and encoders may be used. Inverted service loop 222 may be utilized to supply power to the direct-drive module(s) and facilitate signaling between the direct-drive module(s) and other components of the robotic system, such as a controller 224 comprising a processor and a memory, as shown in FIG. 1. Alternatively, a regular, non-inverted service loop 226 may be employed. As shown in FIG. 1, upper motor 108 may drive hollow outer shaft 112 connected to first link 114 of the robot arm. Lower motor 109 may be connected to coaxial inner shaft 113 which may be coupled via belt drive 115 to second link 116. Another belt arrangement 117 may be employed to maintain radial orientation of third link 118 regardless of the position of the first two links 114 and 116. This may be achieved due to a 1:2 ratio between the pulley incorporated into the first link and the pulley connected to the third link. In alternate embodiments, any suitable ratio or linkage may be provided. Third link 118 may form an end-effector that may carry payload 119, for instance, a semiconductor substrate. It should be noted that the robotic arm of FIG. 1 is shown for exemplary purposes only. Any other suitable arm mechanism or drive mechanism may be used either alone or in combination. For example, multiple direct-drive modules according to one or more embodiments of this invention may be utilized in a single robotic manipulator or a robotic manipulator having multiple manipulators or any suitable combination. Here, the modules may be stacked in different planes along substantially the same axis of rotation, located concentrically in substantially the same plane, arranged in a configuration that combines the stacked and concentric arrangements, or incorporated into the robotic manipulator in any other suitable manner.

The vacuum-compatible direct-drive system of one or more embodiments of this invention may comprise a housing and a radial field motor arrangement including a stator and a rotor, arranged in the vicinity of the stator so that it may rotate with respect to the stator and interact with the stator through a magnetic field substantially radial with respect to the axis of rotation of the rotor. Alternatively, an axial field motor or a combination radial/axial field motor may be provided, or combinations thereof. The stator may include a set of windings energized by a suitable controller based on the relative position of the rotor with respect to the stator. The rotor may include a set of permanent magnets with alternating polarity.

In the embodiment shown, the housing may separate an atmospheric type environment on the outside of the housing from a vacuum or other non-atmospheric environment inside of the housing. Active components, such as the encoder read head or the stator may be fastened to and/or interface with the housing as will be described. For example, the read head or stator may be pressed into or otherwise fastened to the housing to eliminate conventional clamping components and may be encapsulated in a suitable material, such as vacuum compatible epoxy based potting, to limit out-gassing of the components to the vacuum or other non-atmospheric environment as will be described. Here, the encapsulated component may be in vacuum, atmosphere or any suitable environment where the encapsulation protects the stator from the environment, e.g., prevents corrosion, and facilitates efficient heat removal. The encapsulation may also bond the read head or stator to the housing or other component or sub component, further securing the device with respect to the housing. The wires leading to the windings or other active components of the read head or windings of the stator may pass through an opening of the housing which is sealed by the encapsulation, thus eliminating the need for a separate vacuum feed-through. Alternatively, the read head or stator may be clamped, bolted or attached in any other suitable manner to the housing, and the wires leading from the atmospheric environment to the windings or other active components of the read head or the windings of the stator may be routed through a vacuum feed-through or passed through the wall of the housing in any other suitable manner.

Figure 2:
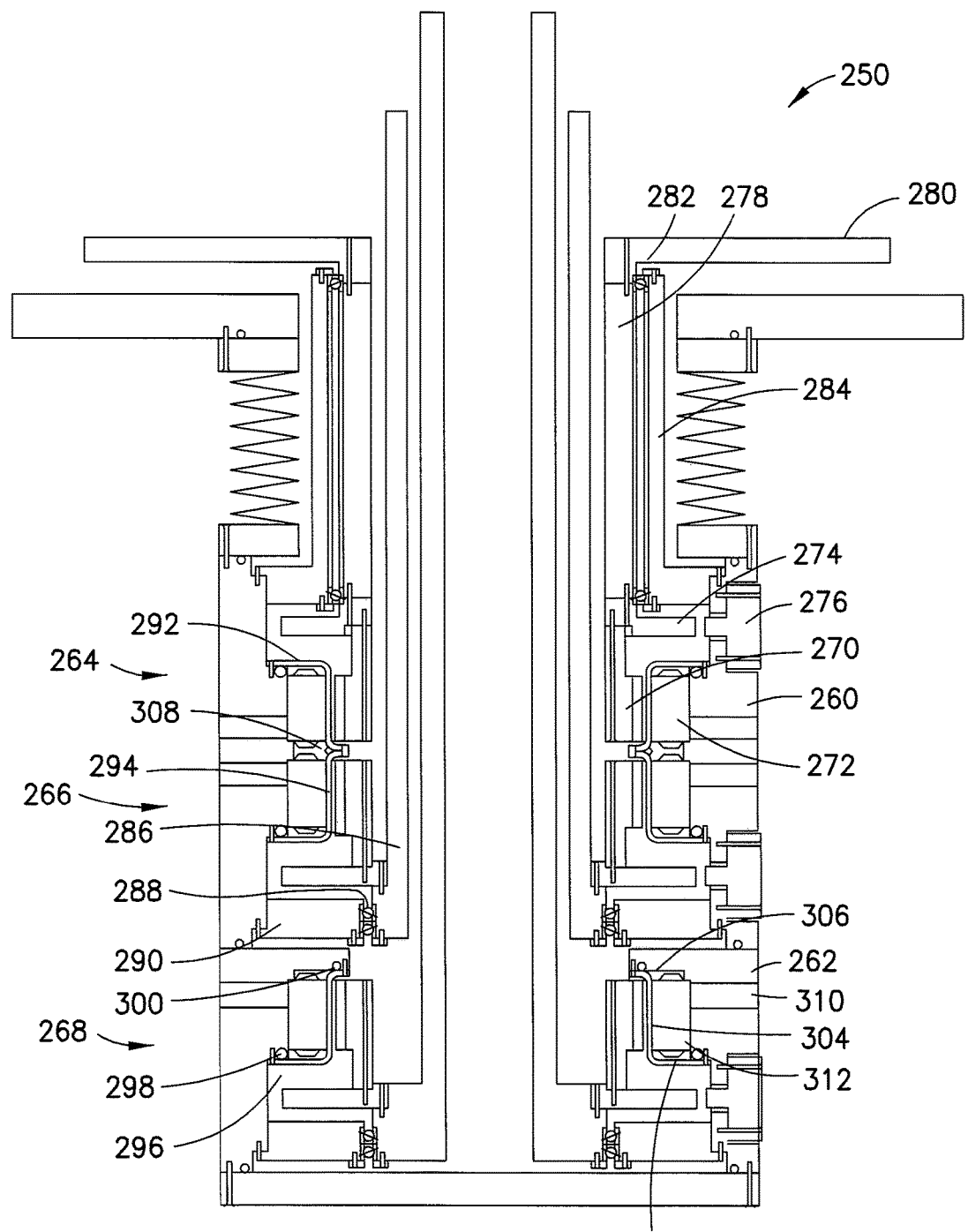
FIG. 2 is a schematic sectional view of an example embodiment.

Referring also to FIG. 2, there is shown an exemplary robot drive 250. Drive 250 is shown with three coaxial drive shafts but may alternately include more or less and may incorporate features as described with respect to the figures or otherwise but not shown in FIG. 2. Drive 250 has two vertically moveable housings 260, 262 where housing 260 supports first and second rotary axes 264, 266 and housing 262 supports third rotary axes 268. The housings may be made from any suitable material, for example, aluminum, stainless steel or otherwise. Exemplary first axis 264 has rotor 270, stator 272, encoder disc 274, read head 276. Read head 276 and stator 272 are coupled and fixed with respect to housing 260. Rotor 270 and disc 274 are coupled to output shaft 278 which drives output flange 280. Spaced angular contact bearings are positively clamped at both ends to shaft 278 and neck 284 where neck 284 is coupled to housing 260. Bearings 282 may be angular contact bearings preloaded in a back-to-back configuration as shown. Alternately, any suitable bearing arrangement may be provided. Axes 266 and 268 similarly have rotors, stators, discs and read heads and output shafts with similar mounting arrangements. For example, axis 266 has output shaft 286 clamped to the inner races of duplex pair of bearings 288 the outer races of which are clamped to intermediate support 290 which is coupled to housing 260. Duplex pair of bearings 288 may be configured preloaded in a face to face mounting arrangement. Alternately, any suitable bearing arrangement may be provided. Axes 264, 266, 268 each have barrier or sleeve 292, 294, 296 that isolate the respective stator from the interior volume of the robot drive. For example, sleeve 296 may be sealed to housing 262 with seals 298, 300 where sleeve 296 may have a substantially axially symmetric shape. Seals may be o rings, potting, metal seals, brazing or any suitable seal. By way of example, sleeve 296 may have lower wall 302 clamped and sealed to housing 262, vertically extending wall 304 and upper wall 306 clamped and sealed to housing 262. Barriers 292 and 294 may have the same or similar features as sleeve 296 but where barrier 292 is clamped and sealed 308 to barrier 294. The barriers may be of any suitable material such as stainless steel or aluminum for example. The barriers may be formed by stamping, spinning, machining or otherwise for example. The barriers may have a uniform or non-uniform thickness. For example, vertically extending portion 304 may be thin, for example, 0.005-0.05 inches thick or any suitable thickness. The stators may be potted with suitable potting with the barrier in place, where the potting may be the seal and may fasten the barrier to the respective housing. Alternately the stator may be potted with a secondary seal, for example, O-ring or otherwise. Alternately, the stator may not be potted and may be fastened mechanically with fasteners, clamps or by press or shrink fit or any suitable method of fastening to the respective housing. Each housing may have one or more passages 310 for the egress of wires, for example from the respective stator or temperature sensor 312 thermocouple or otherwise. The motor in each respective drive may be a brushless motor, for example a toothed brushless motor with magnets on the stator. Alternately, the brushless motor may be a slotless radial flux motor. Alternately, any suitable motor may be provided.

Figure 3:
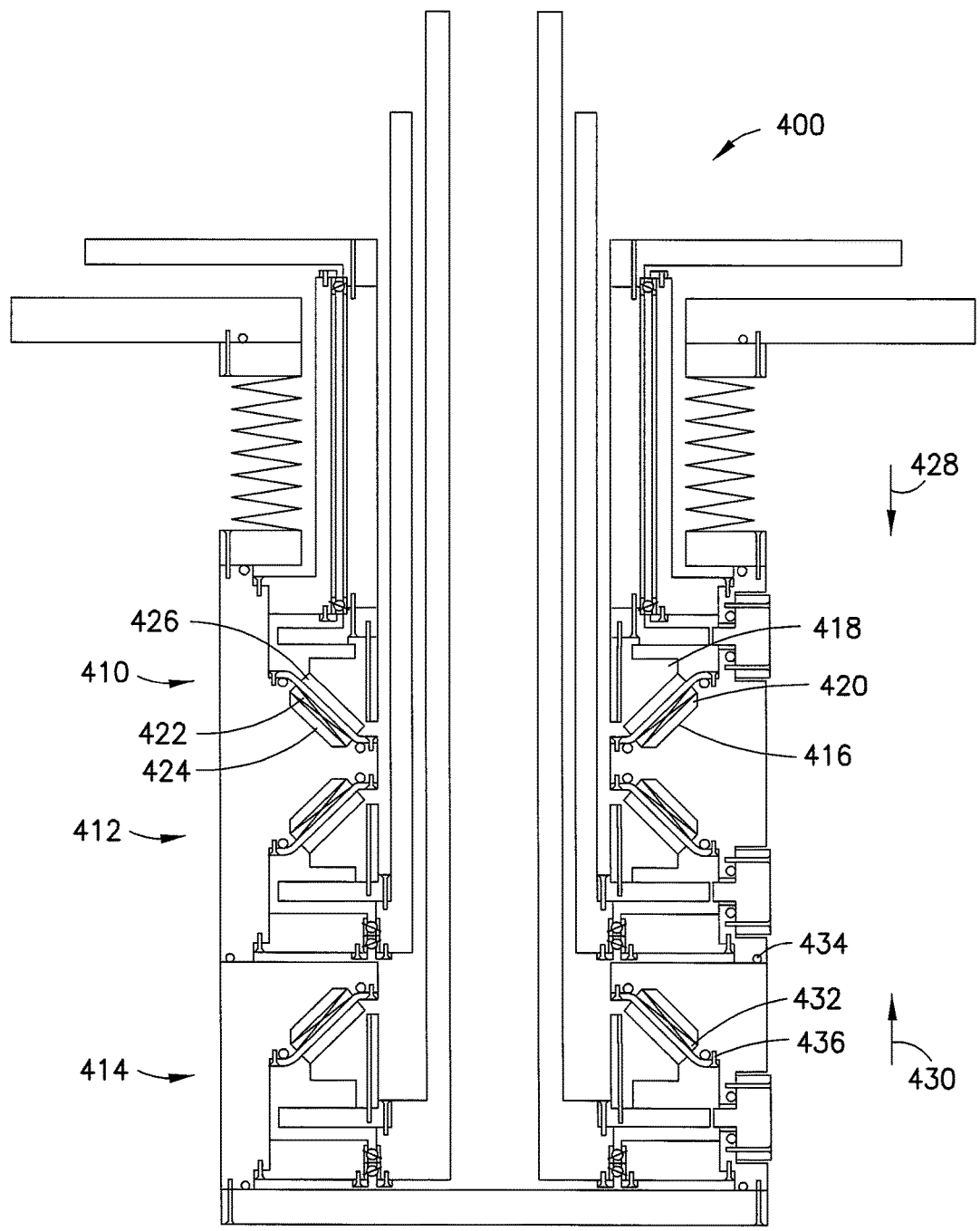
FIG. 3 is a schematic sectional view of an example embodiment.
Figure 4:
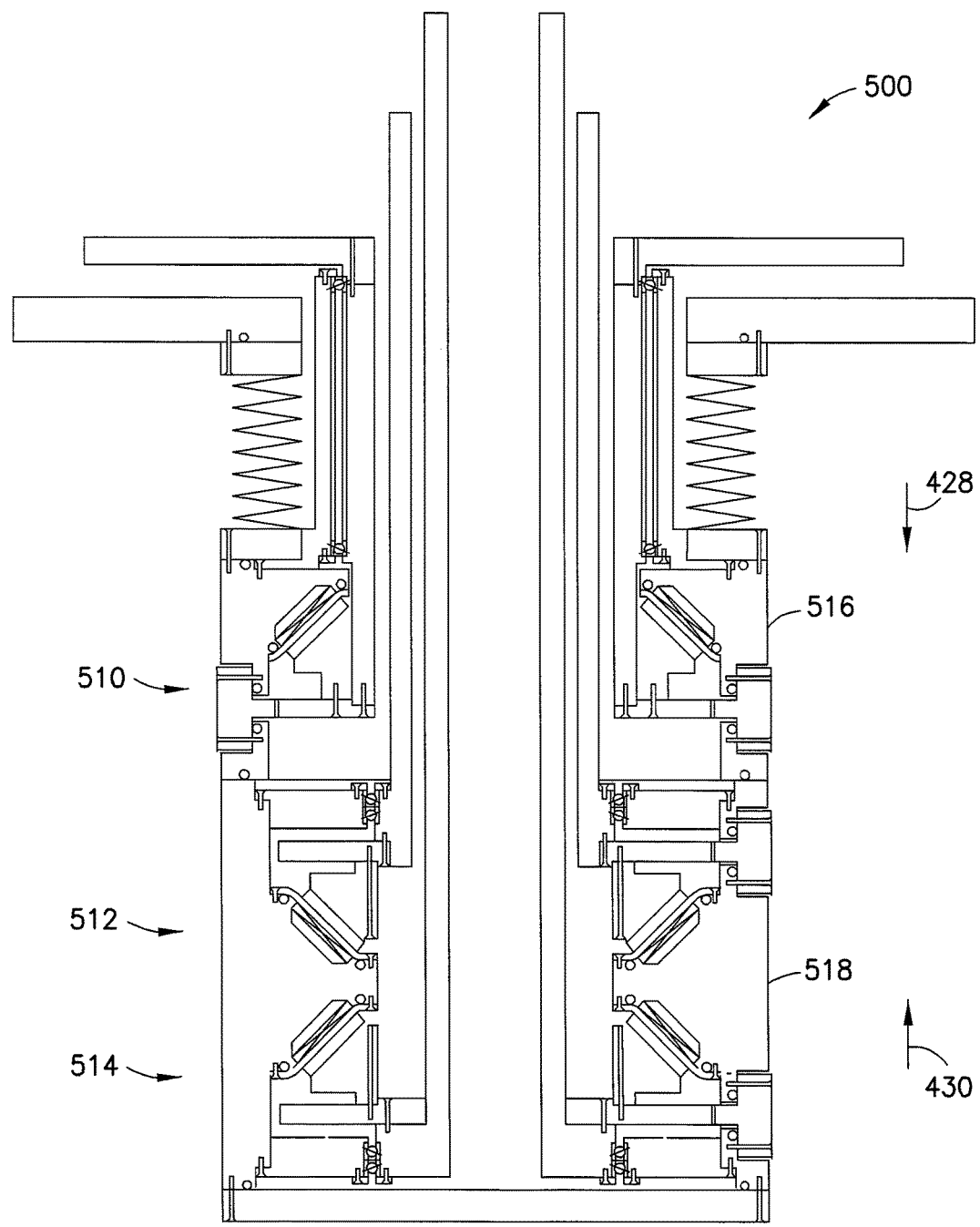
FIG. 4 is a schematic sectional view of an example embodiment.

Referring to FIG. 3 there is shown robot drive 400. Drive 400 is shown with three coaxial drive shafts but may alternately include more or less and may incorporate features as described with respect to the figures or otherwise but not shown in FIG. 3. Drive 400 has three concentric axes 410, 412 and 414. Exemplary axis 410 is shown with a slot less brushless motor 416 having a conical shape. Brushless motor 416 has rotor 418 and stator 420 where rotor 418 has a solid core and magnets and where stator 420 has conical windings 422 and ring 424. Conical barrier or sleeve 426 isolates stator 420 from rotor 418. It is noted that the conical rotors are attracted to their respective stator where axis 410 attraction is in a downward direction 428 and axes 412, 414 are in an upward direction 430. The axial force may be utilized to preload bearings or offset loads or otherwise. By way of example, FIG. 4 shows robot 500 with axis 510 mounted within housing 516 and axes 512, 514 mounted within housing 518. Here, axes 510, 514 have the attractive axial force in the upward direction 430 and axis 512 in the downward direction 428. Alternately the axis may be configured with axial forces in any suitable direction. Alternately, any suitable combination of motors and housings may be provided. In the embodiment shown, two seals are shown between the sleeves or barriers between the stators of axis 410 and 412. In alternate aspects, a single seal may be provided between the barriers. In the embodiment shown, axis 414 has conical barrier such that the attractive force is in an upward direction 430. In alternate aspects, the conical barrier and stator may be provided such that the attractive force is in a downward direction 420 and, for example, where the barrier or sleeve 432 extends to engage seal 434 thus eliminating the need for seal 436.

Figure 5:
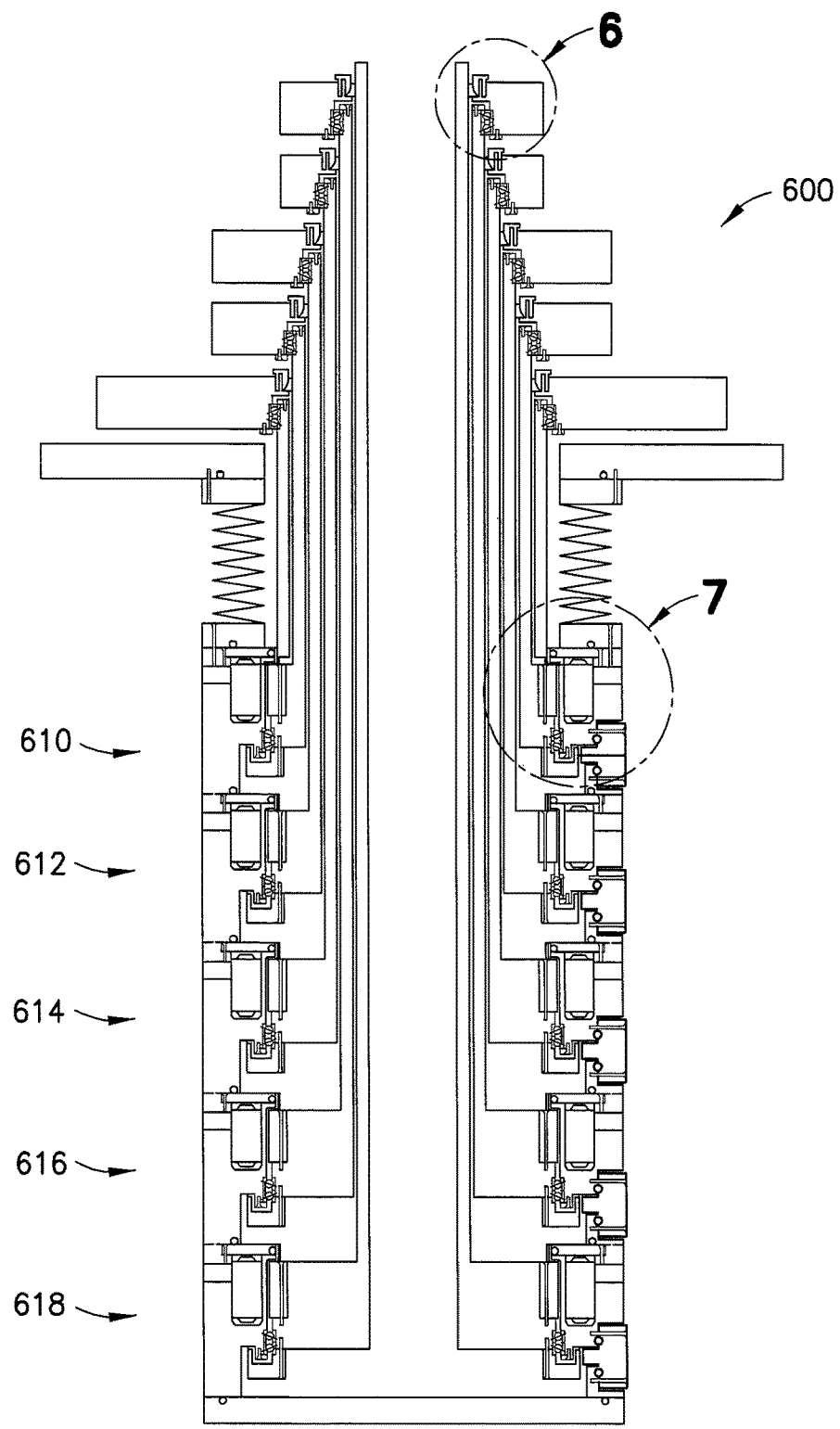
FIG. 5 is a schematic sectional view of an example embodiment.

Referring to FIG. 5 there is shown robot drive 600. Drive 600 is shown with five coaxial drive shafts but may alternately include more or less and may incorporate features as described with respect to the figures or otherwise but not shown in FIG. 5. Drive 600 has concentric axes 610, 612, 614, 616, 618 each sharing common components, for example one or more of each axis may have common bearings, stator, housing, rotor, encoder and/or other components. By way of example, all of axes 610-618 may have such common components. By way of further example, axis 610 may use a bearing arrangement with a neck as described and axes 616, 618 may use smaller diameter components. Alternately, any suitable combination may be provided.

Figure 6:
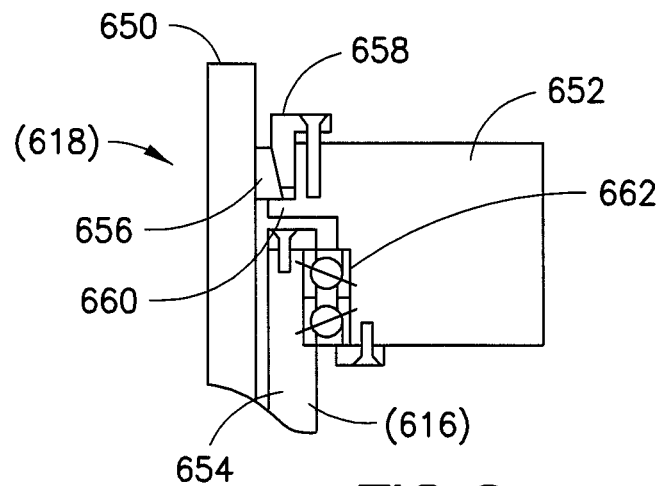
FIG. 6 is a schematic sectional view of an example embodiment.

Referring to FIG. 6, there is shown an exemplary coupling of an output shaft 650 to a driven member 652. In the example shown, output shaft 650 may be coupled to drive axis 618 and output shaft 654 may be coupled to drive axis 616. Tapered clamp collar (ex: ringfeder) 656 is compressed when tapered keyless bushing 658 is coupled or bolted to output member 652 positively coupling output member 652 to shaft 650. In this manner tapered clamp collar (ex: ringfeder) 656 transmits torque coupling member 652 to shaft 650. Shoulder 660 seats collar 656 such that upon clamping flange 658 to member 652, there is no additional axial load imparted to the bearings in the drive. Bearings 662 are provided positively clamped to member 652 and shaft 654 to transmit moment loads. Bearing 662 may be a duplex pair, back-to-back. In alternate aspects, any suitable bearing may be provided. In alternate aspects, similar bearing and coupling arrangements may be provided for one or more of the other axes. In alternate aspects, the collar and clamp may be provided such that the clamping flange engages the shaft with a shoulder on the shaft and where the tapered collar clamps on an output member.

Figure 7:
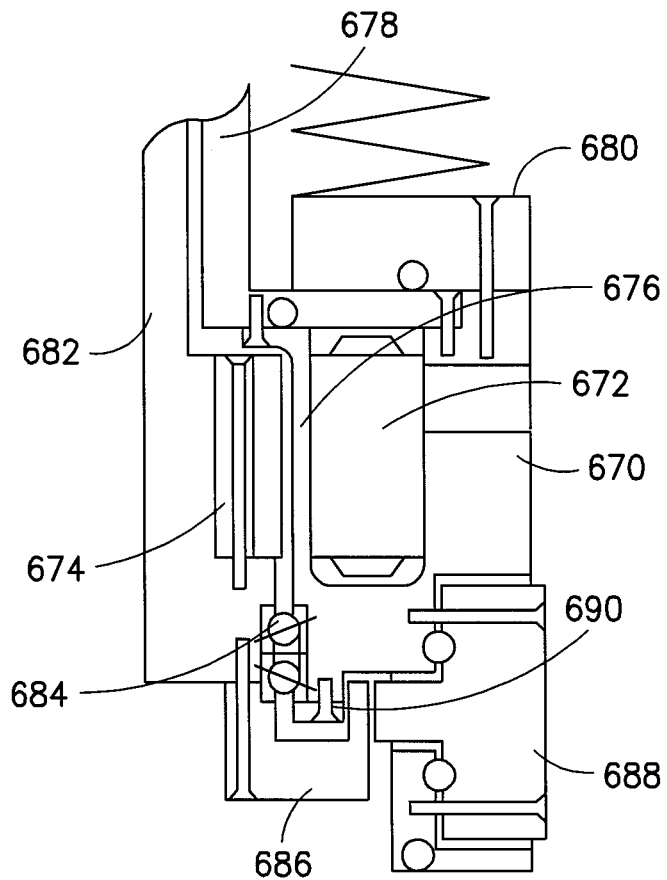
FIG. 7 is a schematic sectional view of an example embodiment.

Referring now to FIG. 7, there is shown a partial section view of drive axis 610. Housing 670 has an integrally formed sleeve or barrier portion 676 isolating rotor 674 from stator 672. Neck 678 seals to the upper portion of barrier 676 and to the flange of bellows 680. Rotor 674 is coupled to shaft 682 which is in turn coupled to housing 670 with bearing 684. Bearing 684 may be positively clamped to shaft 682 at the inner races by encoder disc 686 and at the outer races by clamp 690. Bearing 684 is shown as a face to face duplex pair but alternately may be any suitable bearing, for example, single rotary, angular contact or otherwise. Read head 688 is further coupled to and sealed with respect to housing 670.

Figure 8:
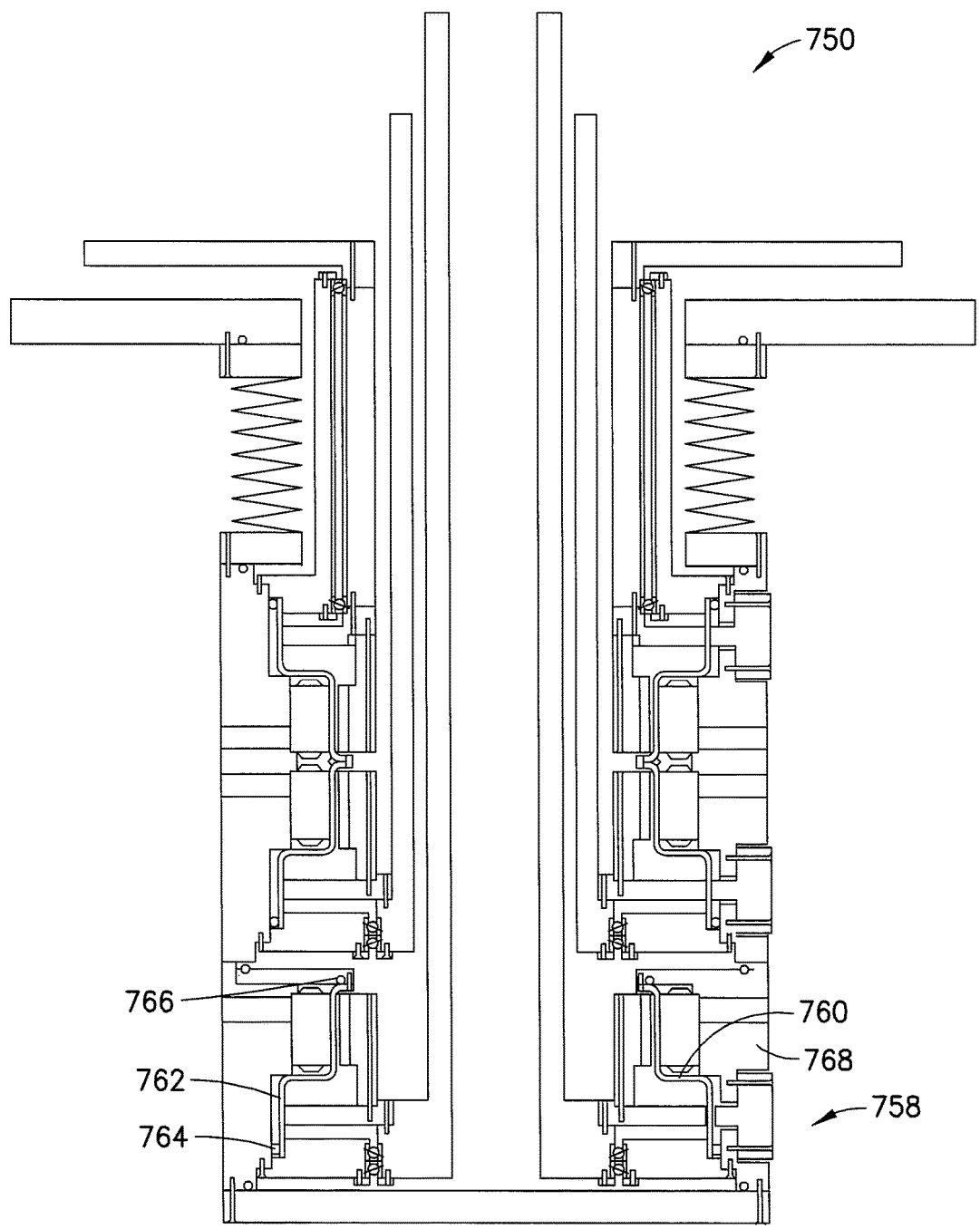
FIG. 8 is a schematic sectional view of an example embodiment.

Referring to FIG. 8 there is shown robot drive 750. Drive 750 is shown with three coaxial drive shafts but may alternately include more or less and may incorporate features as described with respect to the figures or otherwise but not shown in FIG. 8. By way of example, drive 750 shown in FIG. 8 may incorporate the features of drive 250 shown in FIG. 2 with noted or shown differences. Drive 750 has exemplary drive axis 758 with barrier 760 with an additional axially extending portion 762 and sealed to housing 768 at seals 764, 766. In addition to isolating the stator from the rotor, barrier 760 further isolates the encoder read head from the encoder disc. Here, the read head may be moveable on an atmospheric side of the sleeve and may be moveable independent of the sleeve or in conjunction with the sleeve.

Figure 9:
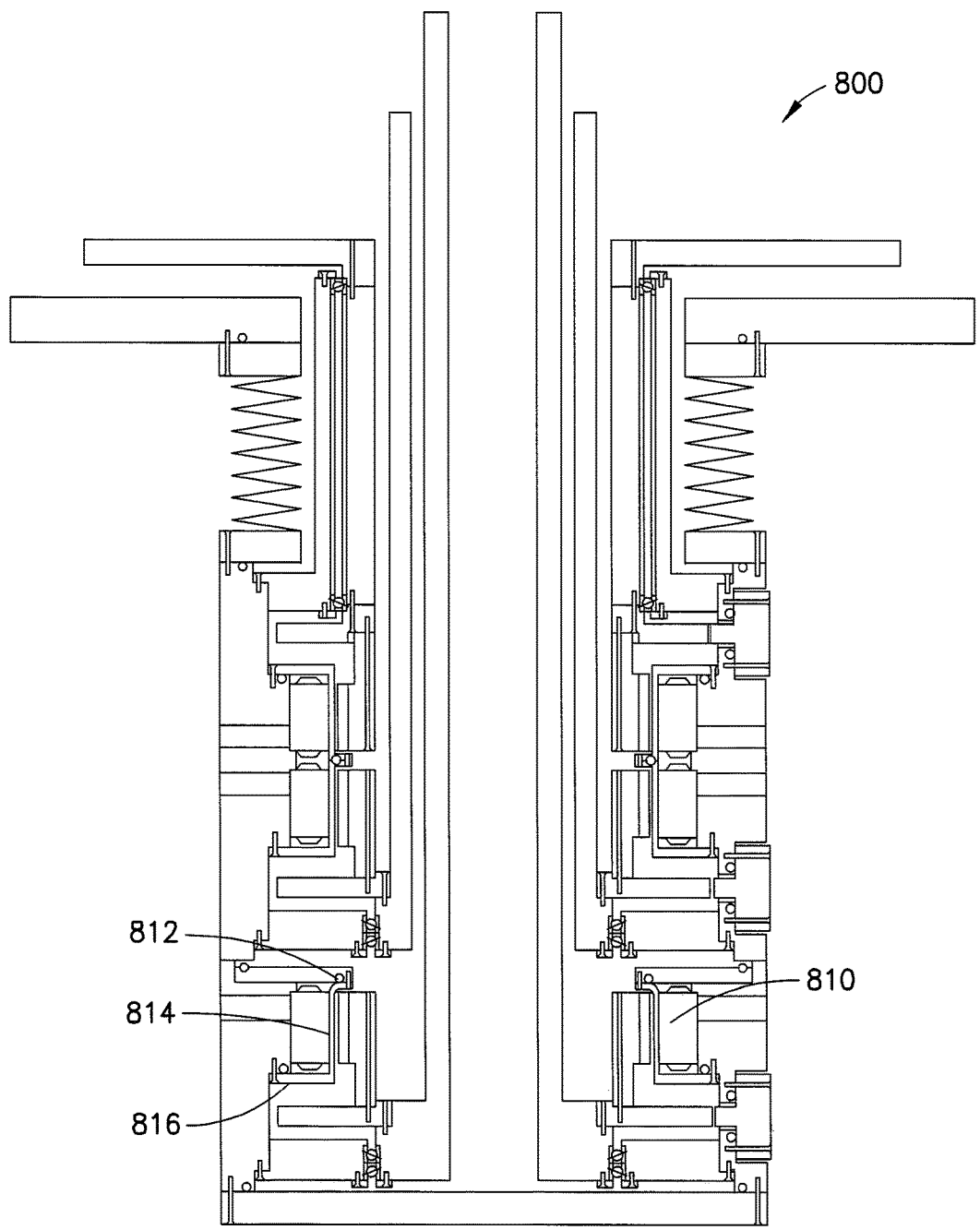
FIG. 9 is a schematic sectional view of an example embodiment.

Referring to FIG. 9 there is shown robot drive 800. Drive 800 is shown with three coaxial drive shafts but may alternately include more or less and may incorporate features as described with respect to the figures or otherwise but not shown in FIG. 9. By way of example, drive 800 shown in FIG. 8 may incorporate the features of drive 250 shown in FIG. 2 with noted or shown differences. Barrier 810 is shown sealed to the lower hosing with flange 812, vertical sleeve portion 814 and flange 816 where flanges 812, 816 are coupled to and sealed with respect to the housing. In the case of machined fabrication, flanges 816, 812 may have thickness different than that of vertical portion 814.

Figure 10:
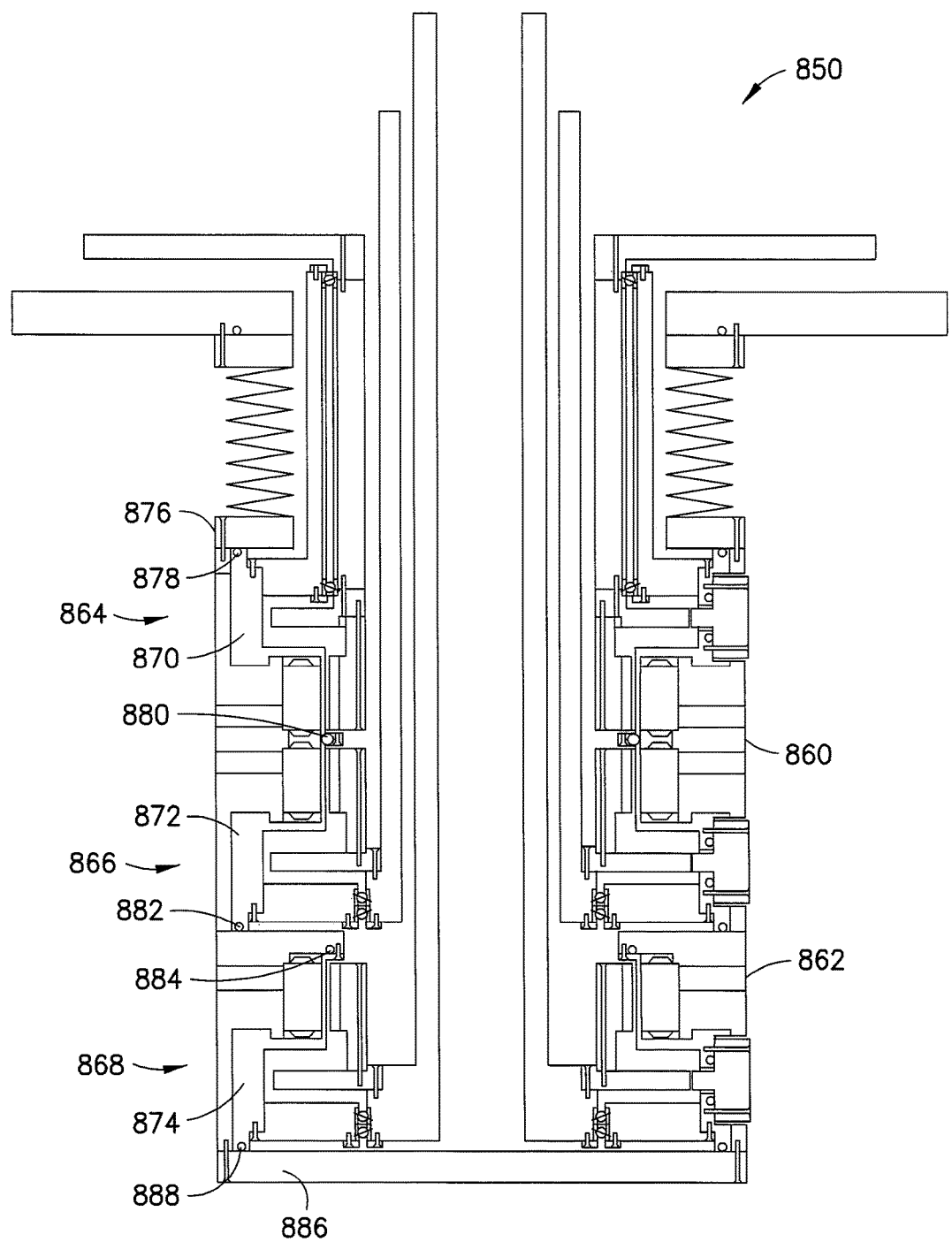
FIG. 10 is a schematic sectional view of an example embodiment.

Referring to FIG. 10 there is shown robot drive 850. Drive 850 is shown with three coaxial drive shafts but may alternately include more or less and may incorporate features as described with respect to the figures or otherwise but not shown in FIG. 10. Drive 850 has first and second housings 860, 862 where housing 860 houses first and second rotary axes 864, 866 and housing 862 houses third rotary axis 868. Housings 860, 862 may be made from aluminum, stainless steel or any suitable material. Inner housings 870, 872 and 874 are further provided that isolate respective stators from rotors and also have features for mounting and sealing respective read heads. Housings 870, 872, 874 may be made from aluminum, stainless steel or any suitable material. And may seal with respect to housing 870 and flange 876 at seal portion 878, housings 870 and 872 at seal portion 880, housing 872 and 862 at seal portion 882, housing 874 and 862 at seal portion 884, housing 874 and cover 886 at seal portion 888.

Figure 11:
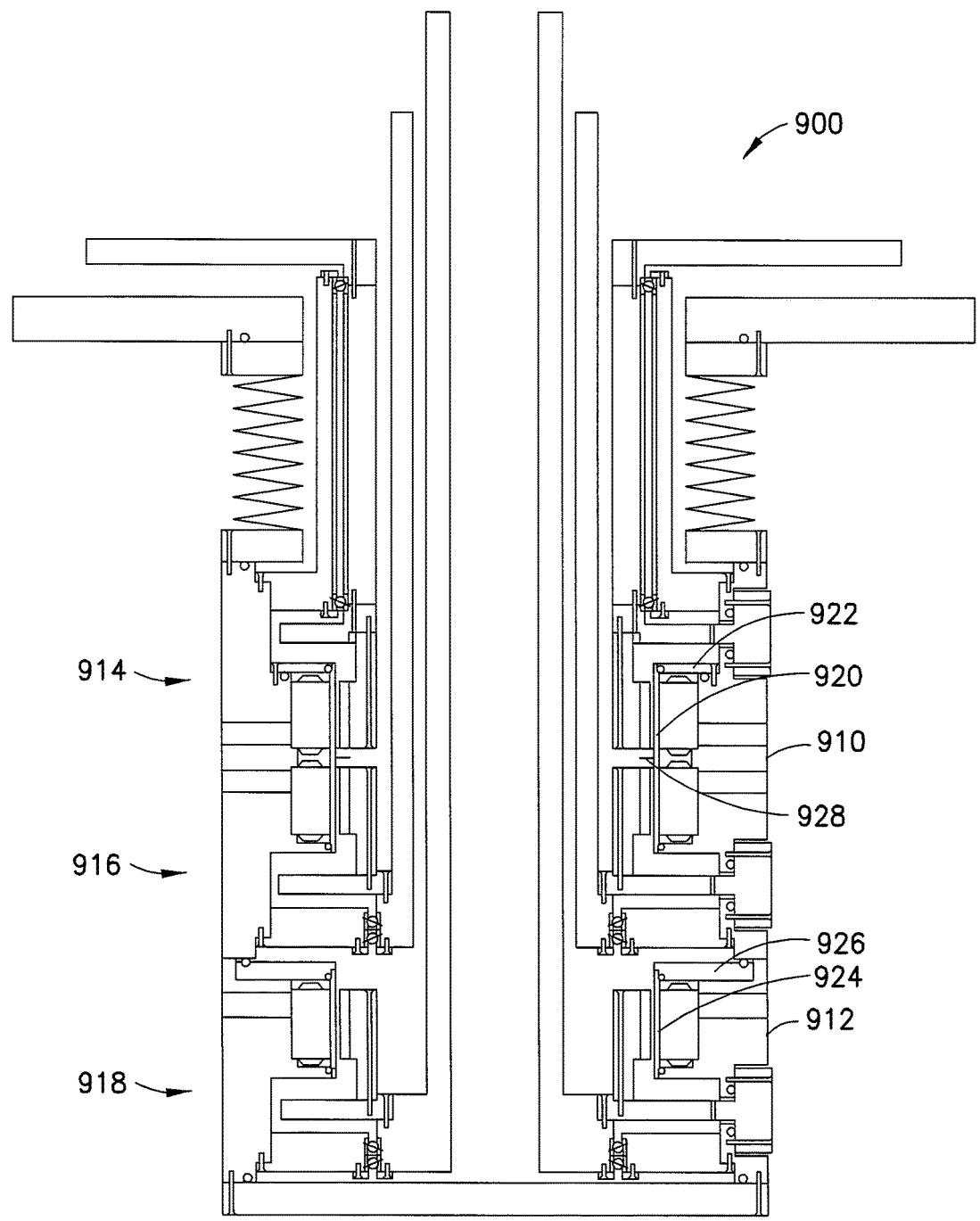
FIG. 11 is a schematic sectional view of an example embodiment.

Referring to FIG. 11 there is shown robot drive 900. Drive 900 is shown with three coaxial drive shafts but may alternately include more or less and may incorporate features as described with respect to the figures or otherwise but not shown in FIG. 11. Drive 900 has first and second housings 910, 912 where housing 910 houses first and second rotary axes 914, 916 and housing 912 houses third rotary axis 918. Housings 910, 912 may be made from aluminum, stainless steel or any suitable material. Barrier 920 seals to housing 910 and ring 922 where ring 922 further seals to housing 910 isolating stators of drives 914, 916 from their respective rotors. Similarly, barrier 924 seals to housing 912 and ring 926 where ring 926 further seals to housing 910 isolating the stator of drive 918 from its respective rotor. Stiffening rib 928 may be provide to stiffen barrier 920. The seals may be radial, axial or any suitable combination.

Figure 12:
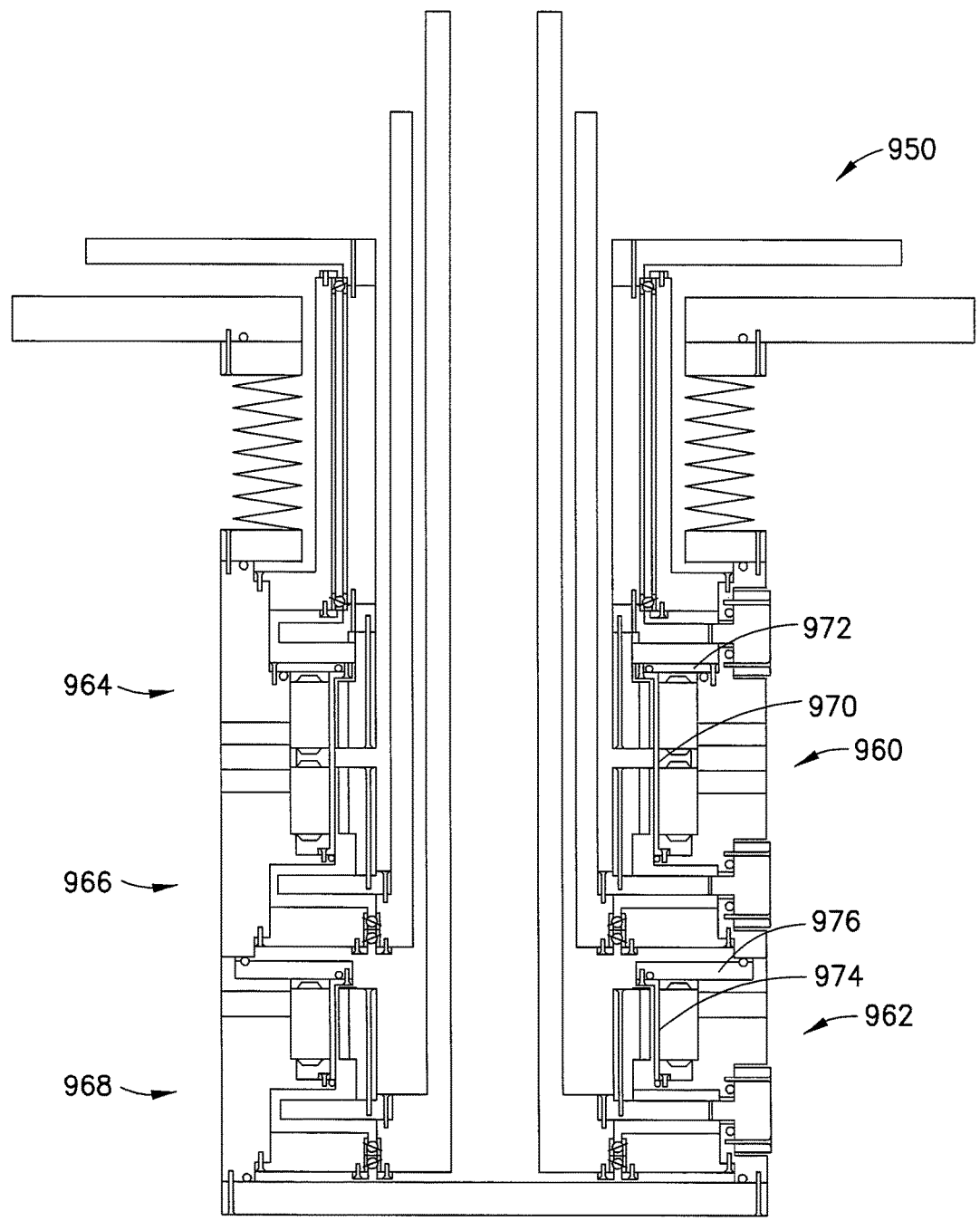
FIG. 12 is a schematic sectional view of an example embodiment.

Referring to FIG. 12 there is shown robot drive 950. Drive 950 is shown with three coaxial drive shafts but may alternately include more or less and may incorporate features as described with respect to the figures or otherwise but not shown in FIG. 12. Drive 950 has first and second housings 960, 962 where housing 960 houses first and second rotary axes 964, 966 and housing 962 houses third rotary axis 968. Housings 960, 962 may be made from aluminum, stainless steel or any suitable material. Barrier 970 seals to housing 960 and ring 972 with flanges and face seals where ring 972 further seals to housing 960 isolating stators of drives 964, 966 from their respective rotors. Similarly, barrier 974 seals to housing 962 and ring 976 with flanges and face seals where ring 976 further seals to housing 960 isolating the stator of drive 968 from its respective rotor. The seals may be radial, axial or any suitable combination.

Figure 13:
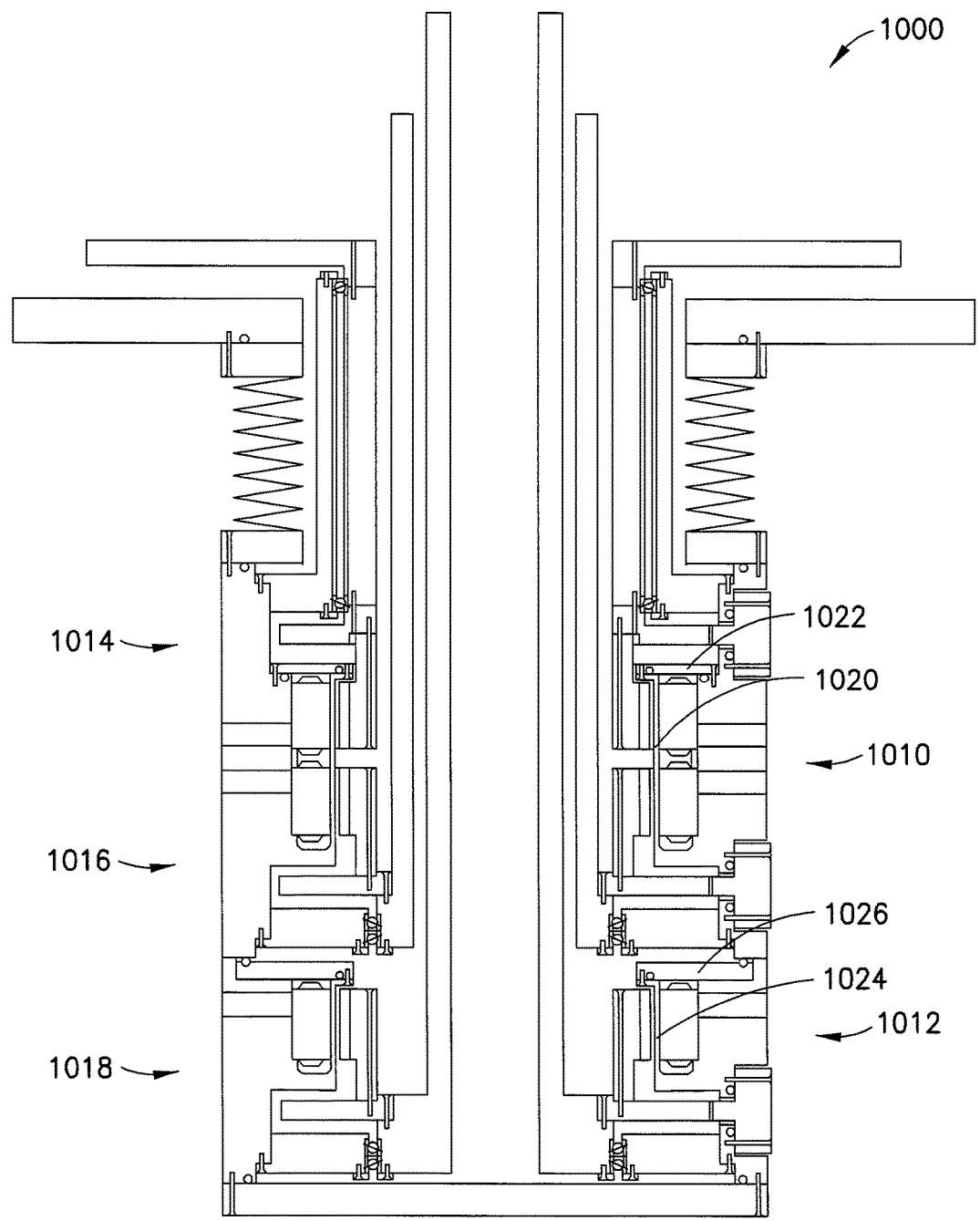
FIG. 13 is a schematic sectional view of an example embodiment.

Referring to FIG. 13 there is shown robot drive 1000. Drive 1000 is shown with three coaxial drive shafts but may alternately include more or less and may incorporate features as described with respect to the figures or otherwise but not shown in FIG. 13. Drive 1000 has first and second housings 1010, 1012 where housing 1010 houses first and second rotary axes 1014, 1016 and housing 1012 houses third rotary axis 1018. Housings 1010, 1012 may be made from aluminum, stainless steel or any suitable material. Barrier 1020 is integrally formed in housing 1010 and seals to ring 1022 where ring 1022 further seals to housing 1010 isolating stators of drives 1014, 1016 from their respective rotors. Similarly, barrier 1024 is integrally formed in housing 1012 and seals to ring 1026 where ring 1026 further seals to housing 1010 isolating the stator of drive 1018 from its respective rotor. The seals may be radial, axial or any suitable combination.

Figure 14:
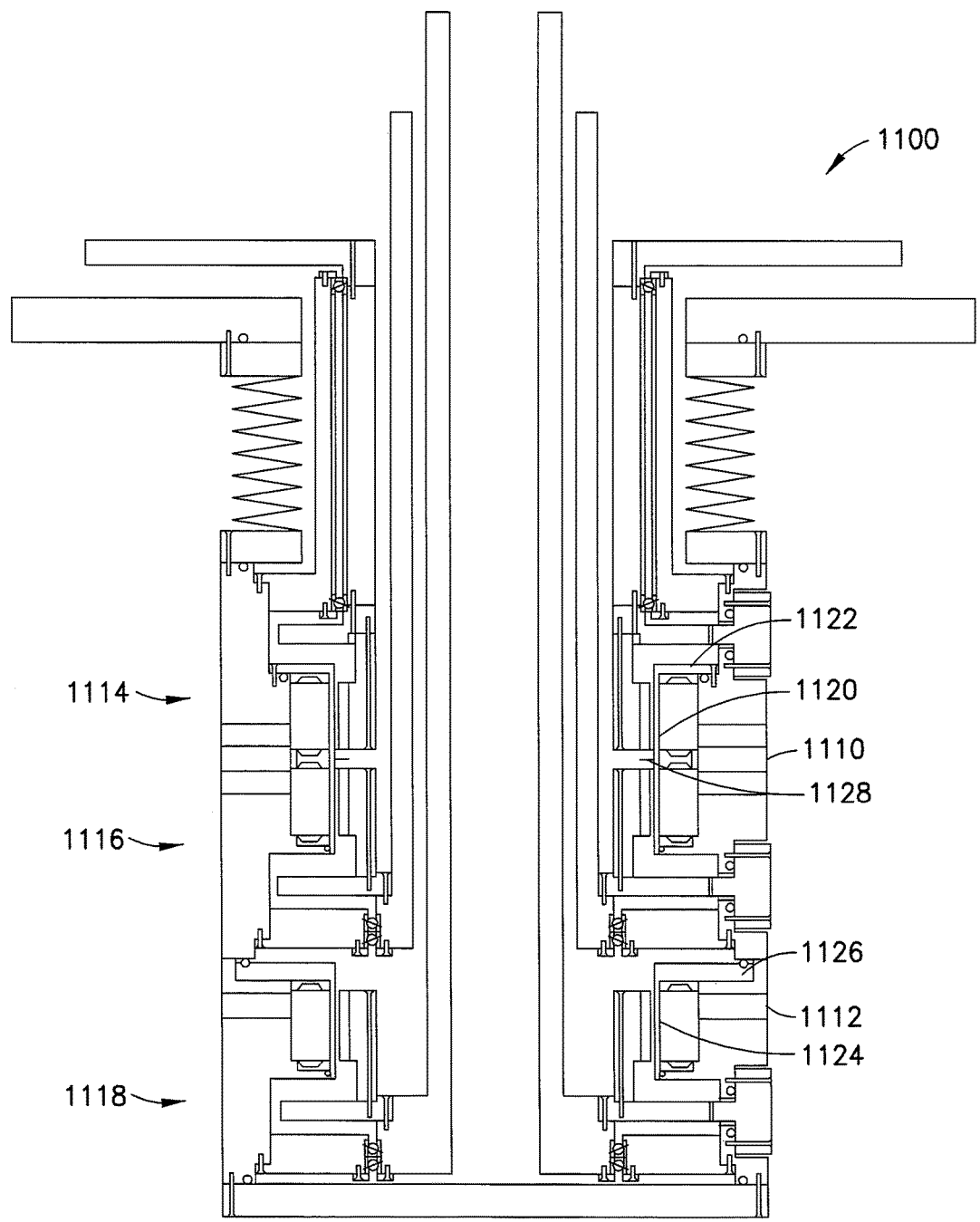
FIG. 14 is a schematic sectional view of an example embodiment.

Referring to FIG. 14 there is shown robot drive 1100. Drive 1100 is shown with three coaxial drive shafts but may alternately include more or less and may incorporate features as described with respect to the figures or otherwise but not shown in FIG. 14. Drive 1100 has first and second housings 1110, 1112 where housing 1110 houses first and second rotary axes 1114, 1116 and housing 1112 houses third rotary axis 1118. Housings 1110, 1112 may be made from aluminum, stainless steel or any suitable material. Barrier 1120 seals to housing 1110 and has integrally formed ring portion 1122 where ring portion 1122 further seals to housing 1110 isolating stators of drives 1114, 1116 from their respective rotors. Similarly, barrier 1124 seals to housing 1112 and has integrally formed ring portion 1126 where ring portion 1126 further seals to housing 1110 isolating the stator of drive 1118 from its respective rotor. Stiffening rib 1128 may be provide to stiffen barrier 1120. The seals may be radial, axial or any suitable combination.

Figure 15:
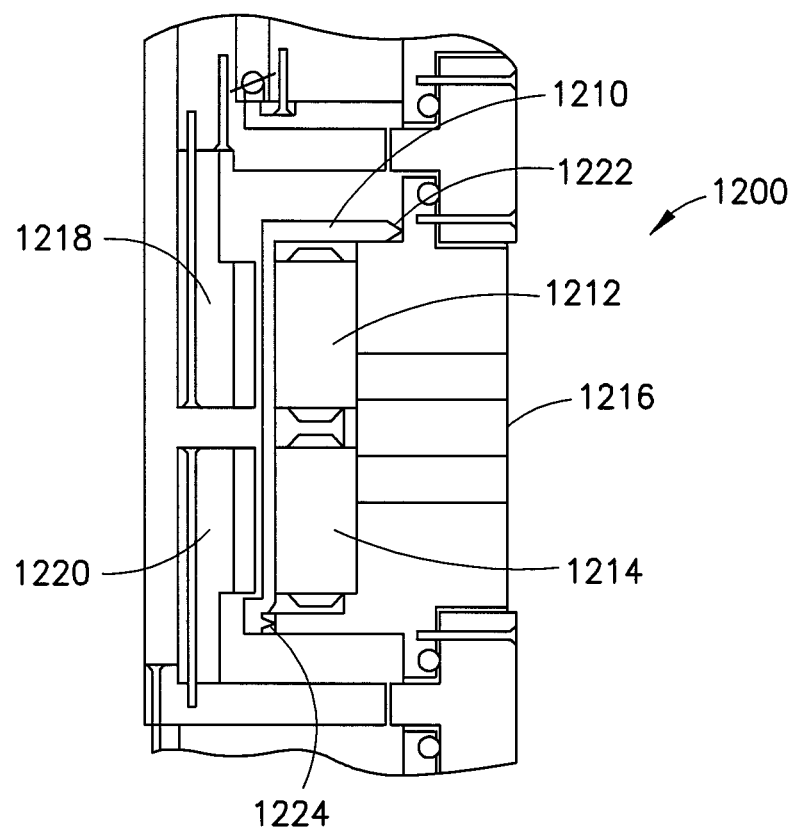
FIG. 15 is a schematic sectional view of an example embodiment.
Figure 16:
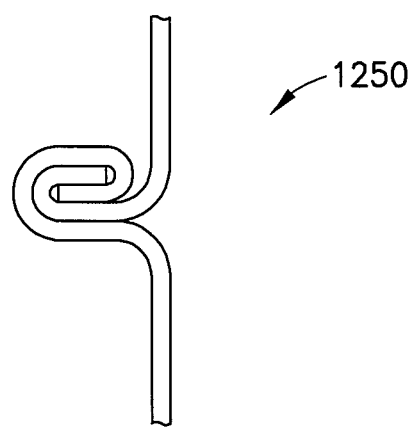
FIG. 16 is an illustration of an example rolled seal.

Referring now to FIG. 15, there is shown an alternate seal arrangement 1200. Barrier 1210 is shown isolating stators 1212, 1214 in housing 1218 from respective rotors 1218, 1220. In the embodiment shown, knife edge seals 1222, 1224 are formed in barrier 1210 with radial pressure applied to form a hermetic seal between housing 1216 and barrier 1210. Here barrier 1210 may be made of stainless steel or other suitable material and housing 1216 may be made of aluminum or other suitable material. The outside diameter of the knife edges on barrier 1210 are designed to interfere with the nominal inside mating diameters of housing 1216. Here, a shrink fit where housing 1216 may be heated and/or barrier 1210 may be cooled to allow clearance with the resulting cooled assembly sealed. In alternate aspects, one or more of the sealing edge features may be provided in housing 1216. Further in alternate aspects, a copper or secondary radial gasket may be provided between the mating sealed parts. In alternate aspects, axial seals, metal or otherwise may be provided. Referring also to FIG. 16, an exemplary rolled seal 1250 may be provided as an alternate to seals previously covered.

Figure 17:
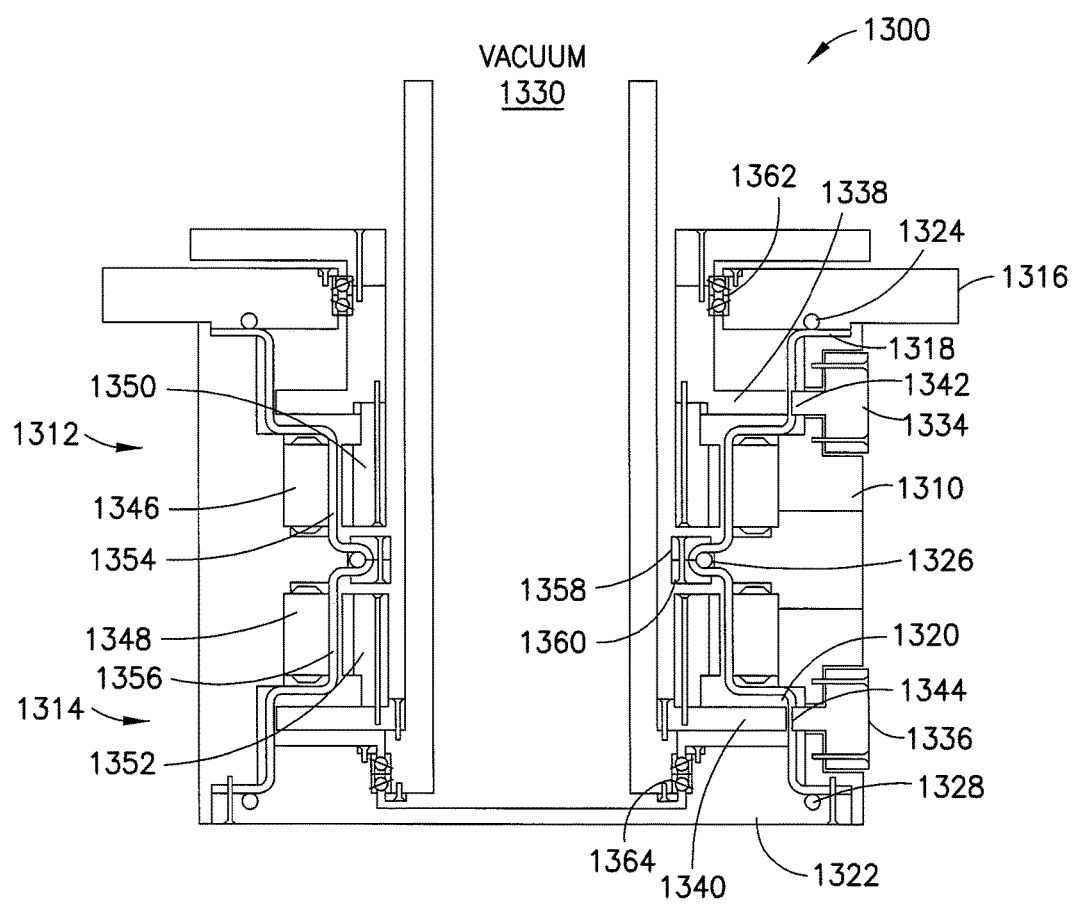
FIG. 17 is a schematic sectional view of an example embodiment.

Referring now to FIG. 17, there is shown a schematic cross section of an exemplary robot drive 1300. Drive 1300 is shown with two coaxial drive shafts but may alternately include more or less and may incorporate features as described with respect to the figures or otherwise but not shown in FIG. 17. Drive 1300 has housing 1310 supporting concentric rotary drives 1312, 1314. A sealed environment or enclosure is formed by mounting flange 1316, first barrier 1318, second barrier 1320 and base plate or cover 1322. First seal 1324 seals flange 1316 to barrier 1318. Second seal 1326 seals barrier 1318 to barrier 1320. Third seal 1328 seals barrier 1320 to base plate 1322. The seals may be o ring seals, such as VITON®, KALREZ®, CHEMRAZ® or otherwise. Alternately, the seals may be metal seals, for example, HELICOFLEX®, CONFLAT or other suitable metal gasket. Here, the metal gasket material may be aluminum, copper, silver plate, nickel or otherwise solid or coated. In the embodiment shown, glands, knife edges or other suitable mating and sealing interfaces may be provided on mating surfaces. Coatings may also be provided on all or a portion of the mating interfaces or parts, for example to improve vacuum performance, hardness of the seal interface or otherwise. Flange 1316 may be aluminum, stainless steel or other suitable material. In the embodiment shown, housing 1310 is not exposed to vacuum and has an exterior portion exposed to atmospheric pressure. Encoder read heads 1334, 1336 may be inductive or other suitable encoder read heads and are isolated from discs 1338, 1340 by barriers 1318, 1320 respectively. Barriers 1318, 1320 may have thinned portions 1342, 1344 where the read heads interface and where the read heads may be bonded to thinned portions 1342, 1344. In alternate aspects, a flange may be welded or otherwise attached to the barrier where the read head may be fastened to the flange, by fasteners such as screws or otherwise. The section may be provided to allow limited adjustment of read heads 1334, 1336 by deflection and flexing of barriers 1318, 1320. In alternate aspects, thinned portions 1342, 1344 may not be provided. Similarly, stators 1346, 1348 are shown isolated from rotors 1350, 1352 by barriers 1318, 1320 respectively. Isolating portions 1354, 1356 of barriers 1318, 1320 may be thinned. In alternate aspects, thinned portions 1354, 1356 may not be provided. Stators 1346, 1348 may be press or interference fit into housing 1310 or otherwise clamped and may or may not be potted within housing 1310. In the event the stator is conical or axial or any suitable shape, the soft metal backing may be sprayed on or otherwise be coupled to housing 1310. Secondary clamps 1358, 1360 may be provided to compress seal 1326 between opposing faces of barriers 1318, 1320. In the embodiment shown, bearings 1362 may be provided with outer race(s) clamped to mounting flange 1316 where mounting flange 1316 is then piloted in a recess within housing 1310. Similarly, bearings 1364 may be provided with outer race(s) clamped to lower flange 1322 where cover or lower flange 1322 is then piloted in a recess within housing 1310. Alternately, any suitable locating features may be provided. Sleeves or barriers 1318, 1320 may be machined, stamped, spun or fabricated by any suitable method or combinations of methods.

Figure 18:
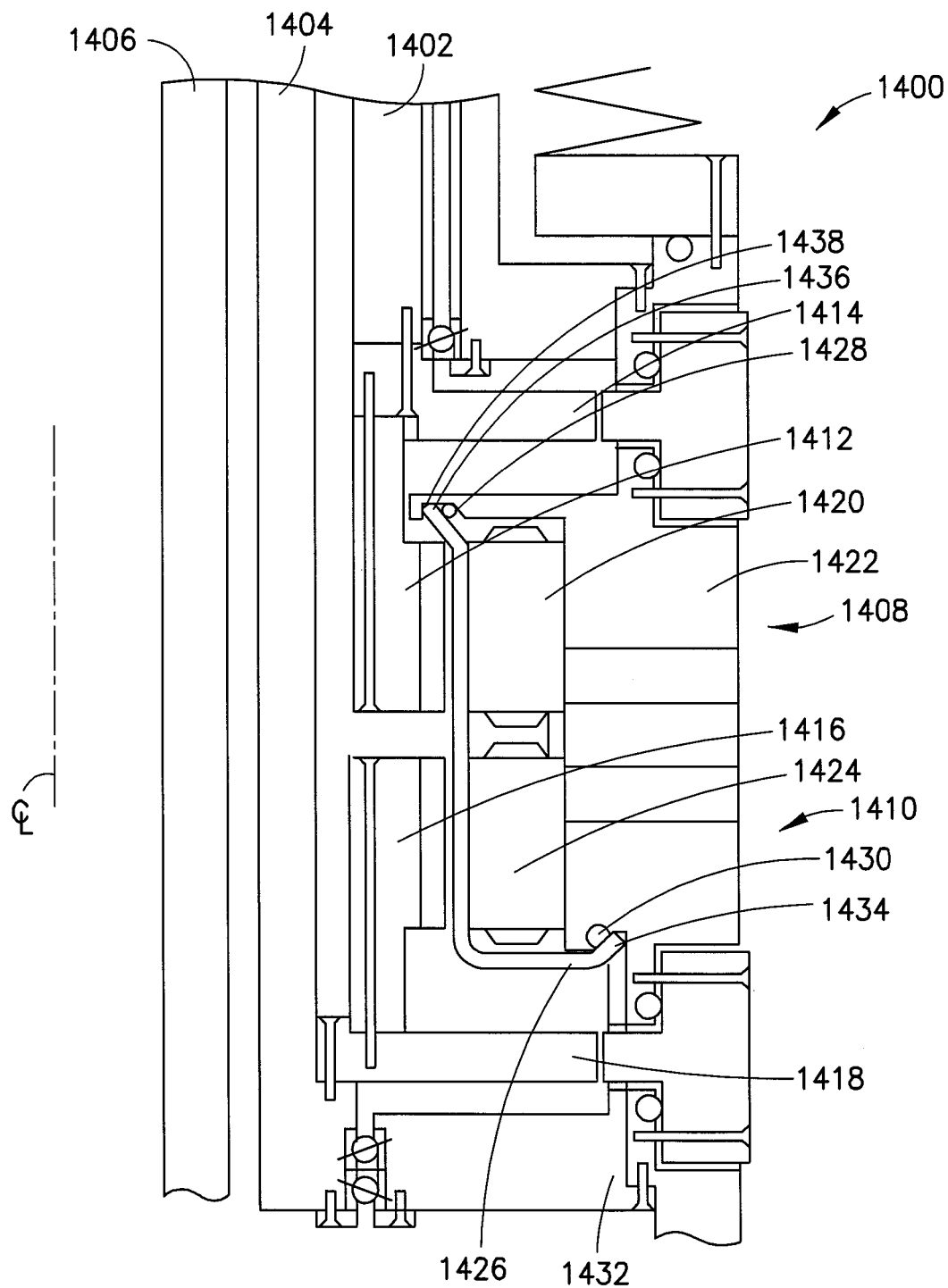
FIG. 18 is a schematic sectional view of an example embodiment.

Referring also to FIG. 18, there is shown partial section view of robot drive 1400. Drive 1400 may have features as previously described. Drive 1400 has output shafts 1402, 1404, 1406 corresponding to first drive 1408, second drive 1410 and third drive (not shown). First drive 1408 has rotor 1412 and encoder disc 1414 coupled to shaft 1402. Second drive 1401 has rotor 1416 and encoder disc 1418 coupled to shaft 1404. First drive 1408 further has stator 1420 coupled to housing 1422. Second drive 1410 further has stator 1424 coupled to housing 1422. Stators 1420 and 1424 may be pressed into housing 1422 or otherwise coupled to housing 1422 such that heat generated by stators 1420 and 1424 may be efficiently transferred to housing 1422. Rotors 1412, 1416 may be in vacuum while housing 1422 may be at least partially exposed to atmosphere. For example, stators 1420 and 1424 may be potted or otherwise fastened into housing 1422. Sleeve or environmental barrier 1426 may isolate rotors 1412, 1416 from stators 1420, 1424. Sleeve or environmental barrier 1426 may have a sealing system having first 1428 and second 1430 seals between housing 1422 and sleeve 1426. Bearing support 1432 deflects and clamps an outer edge 1434 of sleeve 1426 to seal 1430 and to further urge inner edge 1436 of sleeve 1426 against a surface 1438 of housing 1422 such that the sleeve at sealing interfaces does not move in any substantial manner during pumping and venting of the robot.

Figure 19:
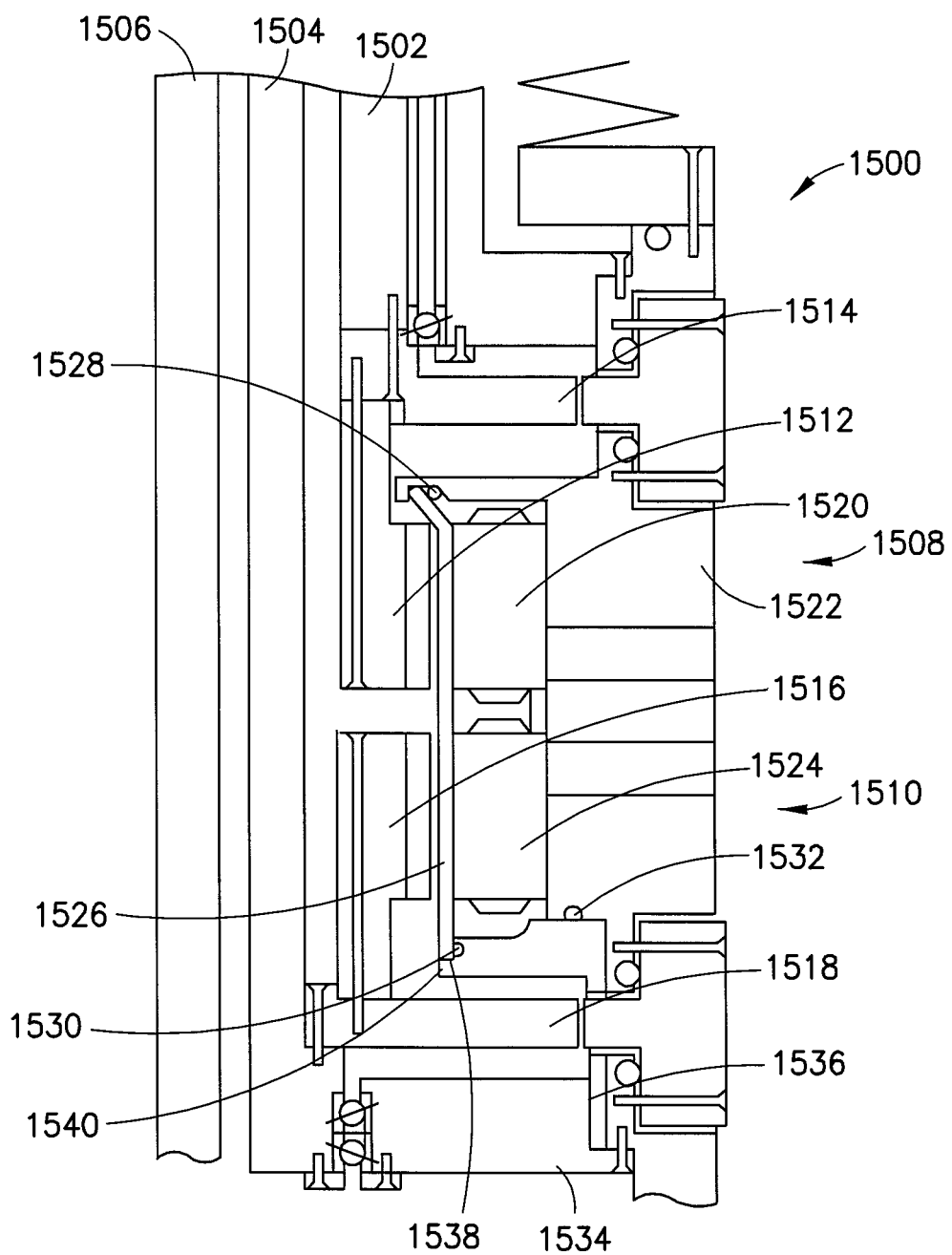
FIG. 19 is a schematic sectional view of an example embodiment.

Referring also to FIG. 19, there is shown partial section view of robot drive 1500. Drive 1500 may have features as previously described. Drive 1500 has output shafts 1502, 1504, 1506 corresponding to first drive 1508, second drive 1510 and third drive (not shown). First drive 1508 has rotor 1512 and encoder disc 1514 coupled to shaft 1502. Second drive 1501 has rotor 1516 and encoder disc 1518 coupled to shaft 1504. First drive 1508 further has stator 1520 coupled to housing 1522. Second drive 1510 further has stator 1524 coupled to housing 1522. Stators 1520 and 1524 may be pressed into housing 1522 or otherwise coupled to housing 1522 such that heat generated by stators 1520 and 1524 may be efficiently transferred to housing 1522. Rotors 1512, 1516 may be in vacuum while housing 1522 may be at least partially exposed to atmosphere. For example, stators 1520 and 1524 may be potted or otherwise fastened into housing 1522. Sleeve or environmental barrier 1526 may isolate rotors 1512, 1516 from stators 1520, 1524. Sleeve or environmental barrier 1526 may have a sealing system having first 1528, second 1530 and third 1532 seals between housing 1522 and sleeve 1526. Bearing support 1534 clamps intermediate member 1536 to seal 1532 against housing 1522 and to further urge edge 1538 of sleeve 1526 against a surface 1540 of intermediate member 1536 such that the sleeve at sealing interfaces 1530 (to member 1536) and 1528 (to housing 1522) does not move in any substantial manner during pumping and venting of the robot.

Figure 20A:
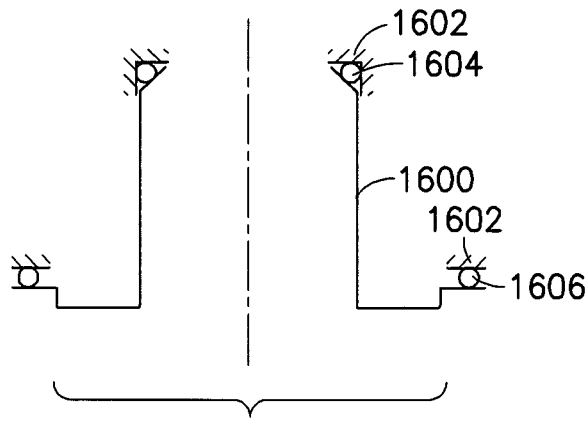
FIGS. 20A-20C are schematic illustrations of example embodiments.
Figure 20B:
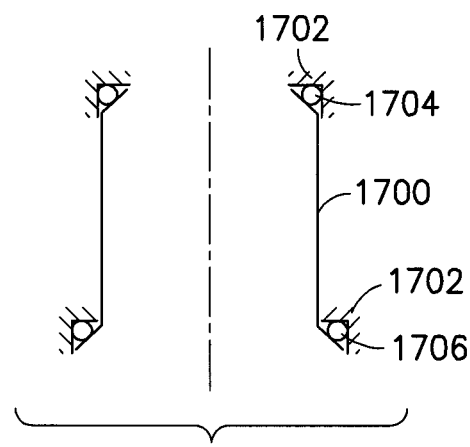
Figure 20C:
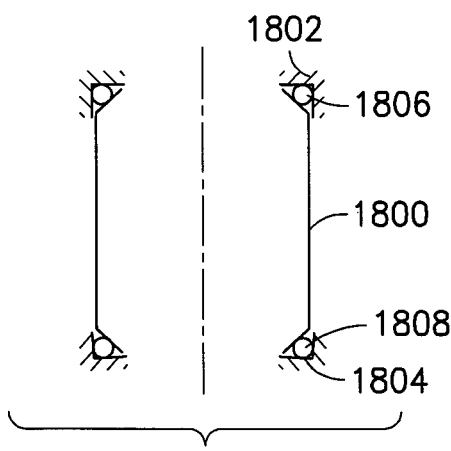

Referring now to FIG. 20A there is shown sleeve 1600 coupled to housing 1602 with a sealing system. The sealing system has first 1604 and second 1606 seals between housing 1602 and sleeve 1600. Seal 1604 may have an angular sealing face against sleeve 1600 and an angular or combination of radial and/or axial seal interface to housing 1602. Seal 1606 may have an axial sealing face against sleeve 1600 and an axial or an angular or combination of radial and/or axial seal interface to housing 1602. Referring also to FIG. 20B there is shown sleeve 1700 coupled to housing 1702 with a sealing system. The sealing system has first 1704 and second 1706 seals between housing 1702 and sleeve 1700. Seal 1704 may have an angular sealing face against sleeve 1700 and an angular or combination of radial and/or axial seal interface to housing 1702. Seal 1706 may have an angular sealing face against sleeve 1700 and an angular or combination of radial and/or axial seal interface to housing 1702. Referring also to FIG. 20C there is shown sleeve 1800 coupled to housings 1802 and 1804 with a sealing system. The sealing system has first 1806 and second 1808 seals between housings 1802, 1804 and sleeve 1800. Seal 1806 may have an angular sealing face against sleeve 1800 and an angular or combination of radial and/or axial seal interface to housing 1802. Seal 1808 may have an angular sealing face against sleeve 1800 and an angular or combination of radial and/or axial seal interface to housing 1804.

An example embodiment, such as shown in FIGS. 2, 9, 14, 18 and 20A for example, may be provided in an apparatus comprising a housing; a motor comprising a stator and a rotor, where the stator is connected to the housing; an environment barrier extending between the stator and the rotor; and a sealing system connecting the environment barrier with the housing, where the sealing system comprises a first seal interface and a second seal interface, where the first seal interface connects to the housing at a first diameter or perimeter which is at least partially less than or equal to an inner diameter or perimeter of the stator, and where the second seal interface connects to the housing at a second diameter which is at least partially greater than or equal to an outer diameter or perimeter of a main section of the stator.

The environment barrier may comprise a one-piece sleeve member which extends between the stator and the rotor, where a first end of the one-piece sleeve member forms part of the first seal interface, and where an opposite second end of the one-piece sleeve member forms part of the second seal interface. The second end of the one-piece sleeve member may be resiliently deflected to spring load a seal of the second seal interface against the housing. The first seal interface may comprise a concave pocket having a single corner in the housing, where the first end of the one-piece sleeve member compresses a first seal of the first seal interface towards the corner. The first end of the one-piece sleeve member may press a first seal in a first outward direction towards the housing, and where the second end of the one-piece sleeve member presses a second seal in a second inward direction towards the housing. The environment barrier may comprise a one-piece sleeve member which has at least one bend of at least 60 degrees between the first and second seal interfaces, and where the at least one bend is spaced from the first and second seal interfaces. The at least one bend may comprise a first bend of about 90 degrees and a second bend of about 40 degrees or more. The first diameter may be less than the inner diameter of the stator. The second diameter may be greater than the outer diameter of the stator. The apparatus may further comprise a position encoder comprising an encoder read head and an encoder disk, where the encoder read head is connected to the housing, where the environment barrier comprises a one-piece member which extends between the stator and the rotor and which extends between the encoder read head and the encoder disk. The apparatus may further comprise an environment chamber and a shaft connected to the rotor, where the rotor and the shaft are in communication with an environment of the environment chamber, and where the housing and the environment barrier separate the stator from the environment of the environment chamber.

An example embodiment, such as shown in FIGS. 12, 19 and 20B for example, may be provided in an apparatus comprising a housing; a motor comprising a stator and a rotor, where the stator is connected to the housing; an environment barrier extending between the stator and the rotor; and a sealing system connecting the environment barrier with the housing, where the sealing system comprises a first seal interface and a second seal interface, where the first seal interface connects to the housing at a first diameter which is less than or equal to an inner diameter of the stator, where the second seal interface connects to the housing at a second diameter which is greater than or equal to the inner diameter of the stator, and where the first and second diameters are different. The environment barrier may comprise a one-piece sleeve member which extends between the stator and the rotor, where a first end of the one-piece sleeve member forms part of the first seal interface, and where an opposite second end of the one-piece sleeve member forms part of the second seal interface. The second end of the one-piece sleeve member may be resiliently deflected to spring load a seal of the second seal interface against the housing. The first seal interface may comprise a concave pocket having a single corner in the housing, where the first end of the one-piece sleeve member compresses a first seal of the first seal interface towards the corner. The apparatus as may further comprise a position encoder comprising an encoder read head and an encoder disk, where the encoder read head is connected to the housing, where the environment barrier comprises a one-piece member which extends between the stator and the rotor and which extends between the encoder read head and the encoder disk. The apparatus may further comprise an environment chamber and a shaft connected to the rotor, where the rotor and the shaft are in communication with an environment of the environment chamber, and where the housing and the environment barrier separate the stator from the environment of the environment chamber.

An example embodiment, such as shown in FIGS. 11 and 20C for example, may be provided in an apparatus comprising a housing; a motor comprising a stator and a rotor, where the stator is connected to the housing; a position encoder comprising an encoder read head and an encoder disk, where the encoder read head is connected to the housing; and an environment barrier connected to the housing, where the environment barrier comprises a one-piece member which extends between the stator and the rotor and which extends between the encoder read head and the encoder disk.

A first end of the one-piece member may form part of a first seal interface, and where an opposite second end of the one-piece member forms part of a second seal interface. The second end of the one-piece sleeve member may be resiliently deflected to spring load a seal of the second seal interface against the housing. The first seal interface may comprise a concave pocket having a single corner in the housing, where the first end of the one-piece sleeve member compresses a first seal of the first seal interface towards the corner. The first end of the one-piece sleeve member may press a first seal in a first outward direction towards the housing, and where the second end of the one-piece sleeve member may press a second seal in a second inward direction towards the housing. The one-piece member may have at least one bend of at least 60 degrees between opposite ends of the one-piece member, and where the at least one bend is spaced from the opposite ends. The at least one bend may comprise a first bend of about 90 degrees and a second bend of about 40 degrees or more. The apparatus may further comprise an environment chamber and a shaft connected to the rotor, where the rotor and the shaft are in communication with an environment of the environment chamber, and where the housing and the environment barrier separate the stator from the environment of the environment chamber.

An example method may comprise manufacturing and assembling an apparatus with features as described above.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   a housing;
   a motor comprising a stator and a rotor, where the stator is connected to the housing;
   a position encoder comprising an encoder read head and an encoder disk, where the encoder read head is connected to the housing; and
   an environment barrier connected to the housing, where the environment barrier comprises a one-piece member which extends between the stator and the rotor and which extends between the encoder read head and the encoder disk.

2. An apparatus as in claim 1 where a first end of the one-piece member forms part of a first seal interface, and where an opposite second end of the one-piece member forms part of a second seal interface.

3. An apparatus as in claim 2 where the second end of the one-piece sleeve member is resiliently deflected to spring load a seal of the second seal interface against the housing.

4. An apparatus as in claim 2 where the first seal interface comprises a concave pocket having a single corner in the housing, where the first end of the one-piece sleeve member compresses a first seal of the first seal interface towards the corner.

5. An apparatus as in claim 2 where the first end of the one-piece sleeve member presses a first seal in a first outward direction towards the housing, and where the second end of the one-piece sleeve member presses a second seal in a second inward direction towards the housing.

6. An apparatus as in claim 1 where the one-piece member has at least one bend of at least 60 degrees between opposite ends of the one-piece member, and where the at least one bend is spaced from the opposite ends.

7. An apparatus as in claim 6 where the at least one bend comprises a first bend of about 90 degrees and a second bend of about 40 degrees or more.

8. An apparatus as in claim 1 further comprising an environment chamber and a shaft connected to the rotor, where the rotor and the shaft are in communication with an environment of the environment chamber, and where the housing and the environment barrier separate the stator from the environment of the environment chamber.

9. An apparatus comprising:
a housing;
a first motor comprising a stator and a rotor, where the stator is connected to the housing;
a position encoder comprising an encoder read head and an encoder disk, where the encoder read head is connected to the housing; and
an environment barrier connected to the housing, where the environment barrier comprises a one-piece member which extends both between the stator and the rotor and between the encoder read head and the encoder disk, where the environment barrier has a first end at a first seal with the housing and a second end at a second seal with the housing.

10. An apparatus as in claim 9 where a first end of the one-piece member forms part of a first seal interface, and where an opposite second end of the one-piece member forms part of a second seal interface.

11. An apparatus as in claim 10 where the second end of the one-piece sleeve member is resiliently deflected to spring load a seal of the second seal interface against the housing.

12. An apparatus as in claim 10 where the first seal interface comprises a concave pocket having a single corner in the housing, where the first end of the one-piece sleeve member compresses a first seal of the first seal interface towards the corner.

13. An apparatus as in claim 10 where the first end of the one-piece sleeve member presses a first seal in a first outward direction towards the housing, and where the second end of the one-piece sleeve member presses a second seal in a second inward direction towards the housing.

14. An apparatus as in claim 9 where the one-piece member has at least one bend of at least 60 degrees between opposite ends of the one-piece member, and where the at least one bend is spaced from the opposite ends.

15. An apparatus as in claim 14 where the at least one bend comprises a first bend of about 90 degrees and a second bend of about 40 degrees or more.

16. An apparatus as in claim 9 further comprising an environment chamber and a shaft connected to the rotor, where the rotor and the shaft are in communication with an environment of the environment chamber, and where the housing and the environment barrier separate the stator from the environment of the environment chamber.

17. A method comprising:
connecting a motor to a housing, where the motor comprises a stator and a rotor, where the stator is connected to the housing;
connecting an encoder disk to the rotor and an encoder read head to the housing;
connecting an environment barrier to the housing, where the environment barrier comprises a one-piece member which extends both between the stator and the rotor and between the encoder read head and the encoder disk, where the environment barrier has a first end at a first seal with the housing and a second end at a second seal with the housing.

* * * * *